United States Patent [19]

Palmer

[11] Patent Number: 4,815,698

[45] Date of Patent: Mar. 28, 1989

[54] HARD SEATED VALVE

[75] Inventor: Robert Palmer, Brookside, N.J.

[73] Assignee: Strahman Valves, Inc., Florham Park, N.J.

[21] Appl. No.: 188,857

[22] Filed: May 2, 1988

[51] Int. Cl.$^4$ ............................................. F16K 25/00
[52] U.S. Cl. ...................... 251/85; 251/176; 251/186
[58] Field of Search ......................... 251/85, 176, 186

[56] References Cited

U.S. PATENT DOCUMENTS

| | | | |
|---|---|---|---|
| 1,034,882 | 8/1912 | Crane | 251/85 |
| 3,211,419 | 10/1965 | Klinger-Lohr | 251/186 |
| 3,241,805 | 3/1966 | Schumann | 251/85 |
| 4,421,298 | 12/1983 | Kujawski | 251/186 |

FOREIGN PATENT DOCUMENTS

| | | | |
|---|---|---|---|
| 1079411 | 4/1960 | Fed. Rep. of Germany | 25/85 |
| 0005471 | of 1889 | United Kingdom | 251/85 |

*Primary Examiner*—A. Michael Chambers
*Attorney, Agent, or Firm*—John G. Gilfillan III; Jeremiah G. Murray

[57] ABSTRACT

A hard seated globe valve assembly for use in servicing high and low temperature fluids. The valve includes a moveable stem attached at one end to a tapered plug of hard material. An equally hard seat having a tapered surface is mounted for mating engagement with the plug when the valve is closed. The seat is located in a partition that separates the globe-shaped body into two chambers having fluid inlet-outlet orifices. An annular ring is mounted between the bearing end of the stem and the plug so that the plug is resiliently engaged in the seat when the valve is closed. It has been found that hard seated valves tend to be difficult to open or lose their sealing abilities when servicing extreme temperature fluids due to the expansion and contraction when the valve is heated and cooled. The resilience of the annular ring prevents this problem by permitting the plug to adjust during expansion and contraction, thus making it easier to open the valve after cooling and precluding loss of sealing during heating.

3 Claims, 1 Drawing Sheet

HARD SEATED VALVE

BACKGROUND OF THE INVENTION

The present invention relates generally to improvements in valves and the like and more particularly to new and improved hard seated valves that regulate the flow of fluids.

In the field of fluid flow regulation, it has been a general practice to employ hard seated globe valves. Such devices typically include a seat and plug having complimentary tapered surfaces that engage when the valve is closed. Although such devices have been successfully used for a considerable number of years, they have not proved entirely satisfactory under all conditions of service for the reason that considerable difficulty has been experienced in operating such valves in conditions of extreme temperatures. Those concerned with the development of such valves have long recognized this problem and have appreciated the need for a solution. The present invention fulfills this need.

SUMMARY OF THE INVENTION

The general purpose of this invention is to provide a valve which embraces all of the advantages of similarly employed hard seated globe valves and does not possess the aforedescribed disadvantage. To attain this, the present invention contemplates a unique stem, plug and seat assembly that is mounted through a spring to attain longitudinal resilience whereby difficulties in opening the valve are avoided.

It is therefore, an object of the present invention to provide a hard seated valve, the operation of which is not adversely affected by changes in temperature.

Another object of this invention is to provide an improved hard seated valve that can be constructed for substantially the same cost as present similar devices.

Still another object is to provide a means for improving hard seated valves that can be employed to retrofit present valves.

The exact nature of this invention as well as other objects and advantages thereof will be readily apparent from consideration of the following specification relating to the annexed drawing in which:

DETAILED DESCRIPTION OF THE PREFERRED EMBODIMENT

Figure 1:
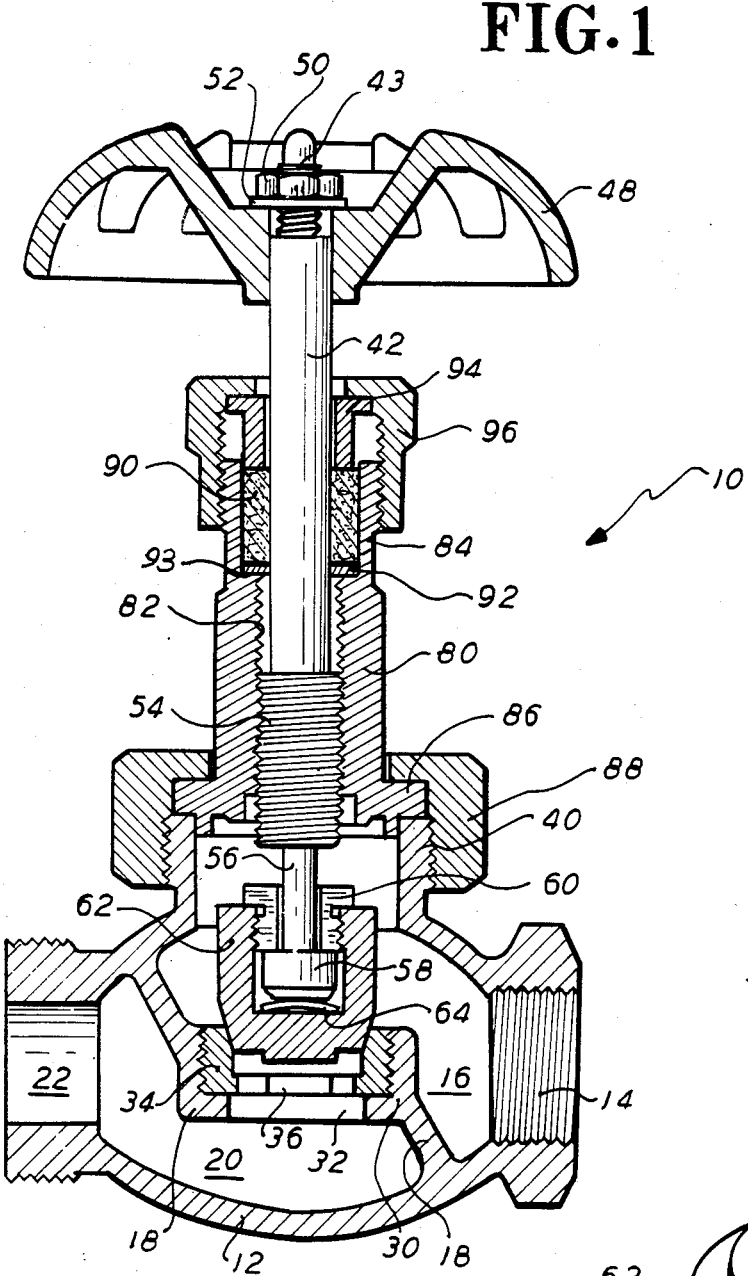
FIG. 1 is a sectional elevation view of a preferred embodiment of the invention.
Figure 2:
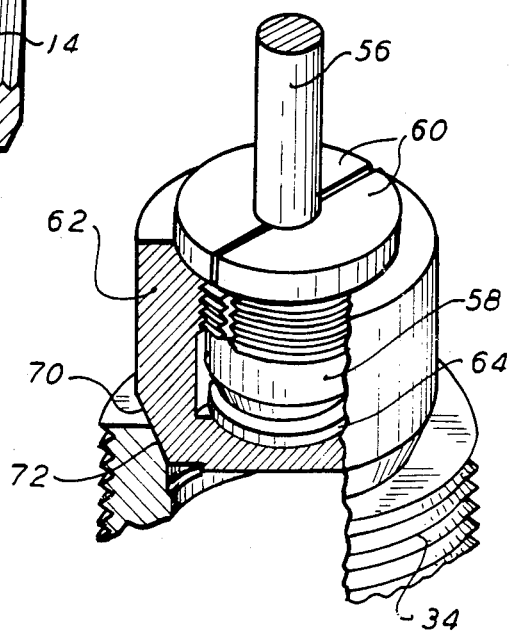
FIG. 2 is an exploded view partly in section and shown in perspective of a portion of the device shown in FIG. 1.

Referring now to the drawing, there is shown a hard seated globe valve 10 comprising a globe valve body 12 having coaxial inlet-outlet orifices 14 and 22, and cavities 16 and 20 separated by a partition 18. Partition 18 has a cup-shaped section 30 centrally located within the globe valve body 12. An aperture 32, located in cup-shaped section 30, provides a passageway between cavities 16 and 20. Fixed in cup-shaped section 30 is a generally cylindrical seat 34 made of a hard material and having an axial bore 36 in coaxial alignment with aperture 32.

Body 12 also includes a threaded sleeve 40 having a bore contiguous with cavity 16 and being axially positioned perpendicular to the common axis of orifices 14 and 22. A stem 42 is mounted coaxially with sleeve 40 and has its proximal end extending therethrough into chamber 16. Stem 42 has a threaded distal end 43 mounting a hand wheel 48 by a nut 50 and lock washer 52. Stem 42 further includes a central threaded portion 54, a reduced portion 56 and an enlarged head 58.

A cup-shaped plug 62, having internal threads and made of the same or similar hard material as seat 34, is freely mounted on head 58 and retained thereon with a retaining split nut 60. Nut 60 surrounds reduced portion 56 and is threaded into plug 62. An arced ring 64, bowed in the center, is freely mounted between the lower end of head 58 and the inside bottom of cup-shaped plug 62. The periphery of ring 64 rests on the surface of plug 62, while the bowed center abuts head 58. The assembly of the split nut 60, the plug 62 and ring 64 is snugly fitted on head 58. Ring 64 functions as both a spring, for providing a resilient force between head 58 and plug 62, and a washer, for providing a reduced friction bearing to permit head 62 to rotate relative to plug 62. A portion of the outside surface of plug 62 is formed as a truncated cone 70. The inside surface 72 of seat 34 is tapered to match the surface of cone 70 on plug 62.

The stem 42 is mounted on the valve 10 by a tubular bonnet 80 having an internally threaded portion 82. An externally threaded portion 84 is located at one end and a flange 86 is located at the other end of bonnet 80. Flange 86 mates with the end of the sleeve 40. A union bonnet nut 88 is threaded onto sleeve 40 and mounts the bonnet 80 onto sleeve 40 by compressing flange 86 against mating sleeve 40. The internally threaded portion 82 has the threads thereof in meshed engagement with the threaded portion 54.

A packing ring 90 surrounds stem 42 and is supported at one end by a retaining ring 92, bearing on an internal shoulder 93 formed in bonnet 80 at the upper end of threaded portion 82, and at the other end by a packing gland 94, retained by a packing nut 96 threaded to bonnet 80 by threaded portion 84.

A typical valve 10, designed to operate with steam or water at 300 p.s.i., may have the following parts constructed of the indicated materials: the globe valve body 12 and bonnet 80 may be bronze; the packing gland 94, bonnet nut 88, and packing nut 90 may be brass; the hand wheel is usually iron; the stem 42, seat 34, plug 62, split nut 60, retaining ring 92, hand wheel nut 50, and lock washer 52 may be formed of various types of stainless steel; the arched ring 64 may be an alloy; and the packing ring 90 may be Teflon. Of course, numerous other suitable materials will become evident to those skilled in the art depending, to some extent, on the intended use and function of the valve.

Of course, operation of the valve 10 occurs by turning the hand wheel 48 to rotate stem 42 within bonnet 80 thereby causing stem 42 to move upwardly or downwardly by the cooperation of threaded portion 54 of the stem 42 with the threads 82 of the bonnet 80. Upon full downward movement of stem 42 the valve 10 is closed and plug 62 is in full engagement with seat 34, i.e. with cone 70 abutting surface 72. When the valve 10 is fully closed, the plug 62 covers the aperture 32 and fluid flow between orifices 14 and 22 is prevented. The valve 10 is opened by turning the hand wheel 48 in the counter clockwise direction, thereby gradually moving plug 62 away from seat 34. Of course, throttling the valve, to produce different degrees of flow, occurs as the distance between the cone 70 and surface 72 is varied.

As explained above, the present valve has all of the many well known advantages associated with similar valves. Additionally, the present valve also avoids a common problem experienced by such valves, viz., difficulty in opening the valve when used with high or low temperature fluids caused by the expansion and contraction of the valve materials when the valve is successively heated and cooled. When substantial contraction of the valve 10 takes place, the forces between cone 70 and surface 72 become substantial and, if left unchecked, will make it difficult for head 58 to withdraw plug 62 from seat 34. Conversely, if the valve material expands, the seat may expand away from the surface at the plug to the extent that the sealing contact may be lost. To solve these problems, the present valve 10 employs the arced resilient ring 64 to take up expansion and contraction of the valve materials by permitting plug 62 to move in seat 34 against the resilient spring forces of ring 64. The ring 64 should have a spring modulus sufficient to permit ring 64 to hold plug 62 seated in seat 34 under all operating temperatures and pressures without completely deflecting the ring 64. Additionally, the spring modulus of ring 64 should be such as to permit the plug 62 to move up or down with respect to seat 34 in response to the forces that occur between cone 70 and surface 72 during heating and cooling, thus, making it easier to open the valve after cooling and precluding loss of sealing engagement during heating.

It should be understood, of course, that the foregoing disclosure relates to only a preferred embodiment and that modifications may be made therein without departing from the spirit and the scope of the invention as set forth in the appended claims.

What is claimed is:

1. A hard seated valve comprising:
    a valve body having first and second fluid orifices;
    a partition fabricated from a hard material mounted in said body separating said fluid orifices and having an aperture therein;
    said aperture having a hard peripheral wall in the form of a frustro conical surface formed in said partition;
    an elongated stem having a head on one end thereof;
    a cup-shaped plug fabricated from a hard material and having a solid bottom wall and a hard peripheral side wall, the outside surface of which is frustro conical and congruent to said frustro conical surface of said aperture;
    a spring located in said plug;
    said plug mounted on said head with said spring located between said head and said bottom wall of said plug;
    said stem mounted on said body with said one end extending into said body;
    means for selectively moving said stem longitudinally between an open position, wherein said plug is spaced from said aperture, and a closed position, wherein said plug is superimposed in said aperture with said frustro conical surfaces in abutment and congruent to each other; and
    wherein said head in said closed position partially compresses said spring against said bottom wall of said plug and said plug is free to move longitudinally with respect to said head.

2. A valve according to claim 1 wherein said spring is a bowed ring.

3. A valve according to claim 2 wherein said spring has a center and periphery and wherein said center is bowed into slideable engagement with said head and said periphery is in slideable engagement with the bottom wall of said plug.

* * * * *